United States Patent [19]

Virdia

[11] Patent Number: 4,873,427
[45] Date of Patent: Oct. 10, 1989

[54] CARD OR PASS IN PLASTIC MATERIAL INCORPORATING AN INTEGRATED MEMORY CIRCUIT

[75] Inventor: Antonio Virdia, Trento, Italy

[73] Assignee: Pentasystem S.p.A., Trento, Italy

[21] Appl. No.: 76,931

[22] PCT Filed: Jul. 8, 1986

[86] PCT No.: PCT/IT86/00050
§ 371 Date: Jul. 30, 1987
§ 102(e) Date: Jul. 30, 1987

[87] PCT Pub. No.: WO87/02807
PCT Pub. Date: May 7, 1987

[30] Foreign Application Priority Data
Oct. 23, 1985 [IT] Italy ................ 22594 A/85

[51] Int. Cl.⁴ ........................... G06K 19/06
[52] U.S. Cl. ..................... 235/492; 235/468
[58] Field of Search ............... 235/492, 468

[56] References Cited
U.S. PATENT DOCUMENTS
4,004,133 1/1977 Hannan ................ 235/492

*Primary Examiner*—Harold I. Pitts
*Attorney, Agent, or Firm*—Young & Thompson

[57] ABSTRACT

A card or pass comprising at least two layers, suitably mated, of shock-resistant plastic film transparent to infrared light. Inside these layers, identification optical codes, readable in transparency by means of infrared rays, are printed. Inside these layers still, a seat, suitably shaped to receive an integrated memory circuit connected to the outside by means of four contacts, is provided. Each contact has a very precise function according to its connection with the circuit which comprises an integrated memory circuit of EEPROM technology with interfacing protocol on two wires and with voltage converter on chip so as to eliminate the necessity of several feeding voltages.

7 Claims, 2 Drawing Sheets

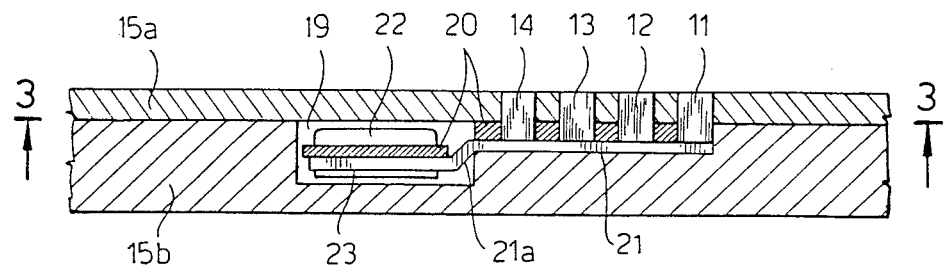
FIG. 4
FIG. 5
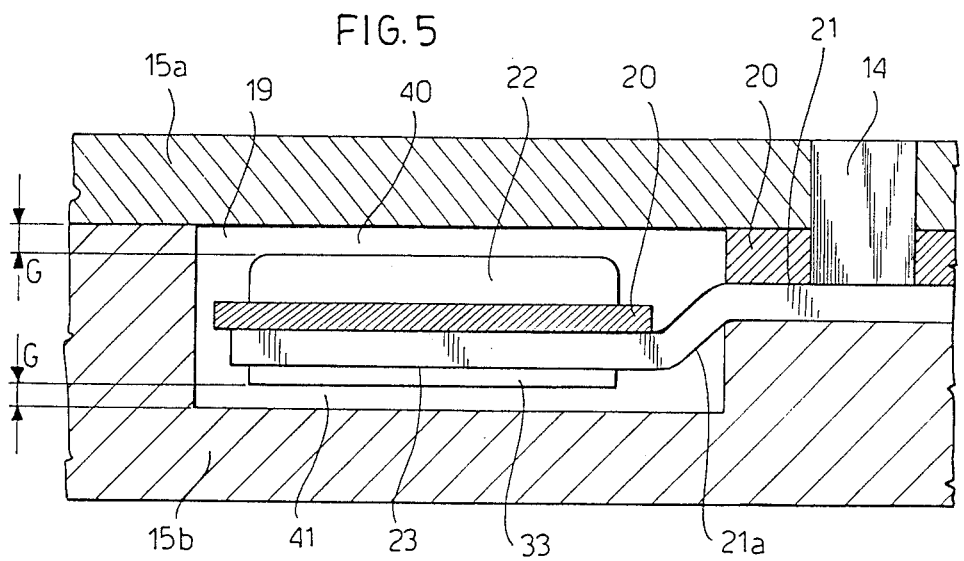
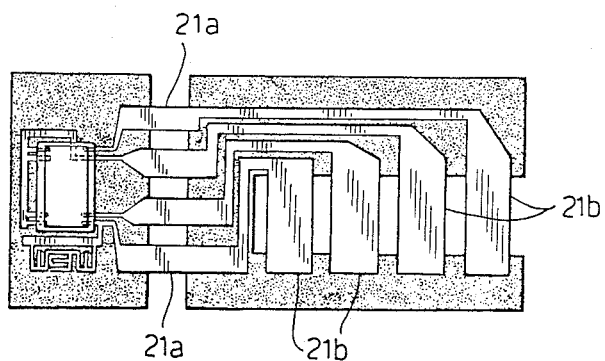
FIG. 6

CARD OR PASS IN PLASTIC MATERIAL INCORPORATING AN INTEGRATED MEMORY CIRCUIT

BACKGROUND OF THE INVENTION

The present invention relates to a card or pass formed of plastic material and incorporating an integrated memory circuit and an univocal optical code for identification of the card. At present such supports are for instance widely used for credit cards, automatic cashpoint cards and identification passes.

Such a memory support is useful in all of those cases where high data safety and protection against fraud resulting from unlawful manipulation are required. In particular, it is utilized for electronic memory credit cards where data safety and small dimensions of the electronic device are fundamental to the reliability of the product.

BRIEF DESCRIPTION OF THE PRIOR ART

The data protection devices presently available are obtained by providing in the card a further device (normally a suitably programmed single chip microprocessor) which works as a filter between the memory and the outside world. This device or microprocessor can also be on the same silicon chip which houses the memory matrix. Such an arrangement entails a series of drawbacks. First of all, the microprocessor occupies a considerable area of the silicon chip, with the consequence of increasing considerably the cost of the device. Secondly, the microprocessor requires a series of interfacing signals towards the external world (clock, reset...) which necessarily complicate the connection with the writing/reading devices. Thirdly, the program contained on the microprocessor can be read by using suitable techniques, thus making the system less safe.

The presently available cards or passes, of the type to which the present invention applies, foresee more than four external electric contacts, on two rows, for connection with the internal circuit. Since the electric and mechanical reliability of such devices is in inverse ratio to the number of connecting contacts, the assembly is of poor reliability during usage. Moreover, the writing and reading devices to be used with this support are complex and expensive owing to the intrinsical difficulty of carrying out contact means which maintain a good alignment in the course of time.

SUMMARY OF THE INVENTION

One object of this invention is therefore to carry out a credit card or similar device which is extremely strong, that is as flexible and capable of withstanding wear and tear as much as possible, which allows for protection of the data contained in an electronic memory, not including programmed logic, against access and/or alteration attempts from unauthorized persons, and to allow the reading and/or writing with devices less complicated than the existing ones.

According to the invention, a support comprising an integrated memory circuit of EEPROM technology is provided. This is connected with the outside only through four contacts and contains voltage conversion circuits able to generate internally, starting from a single voltage (for instance 5 volts), the one necessary to the programming of the memory cells, with the consequence that the integrated circuit works with a single feeding voltage. Through one of the contacts an input signal (for instance at 5 volts in continuous current ±5%) is transmitted and through another contact a connection with the input outgoing line is foreseen. A logical type signal passes through a further contact and acts as clock signal for data and instructions and an open drain bi-directional line (SDA) passes through a fourth contact which acts as support for data and instructions. Preferably, the signals have the logical "zero" included between −1 V and 0.8 V and the logical "one" included between 2 V and VCC+0.5 V.

An improvement provides for the integrated memory circuit to have an asynchronous serial interface on two wires and contains the necessary circuits for handling a feeding protocol with an external writing and/or reading device for handling the writing timing, for the random access to any memory byte and for any other operation which might be required.

A further improvement provides for the integrated memory circuit to be implemented with a digital filter to filter the disturbances which may be present on the communication lines with the external world.

Another improvement foresees that the four contacts are arranged on a single line, so as to increase the resistance of the card to mechanical stress. In this case provision is made also for the contacts to be connected to the integrated unit in such a way as to be on a single side of it.

A further improvement provides for the thickness of the seat which receives the portion of the integrated circuit to be bigger than the thickness of the integrated circuit. The only support of the integrated circuit are the four tracks coming out from one side only, so that the integrated circuit can slightly move inside the seat while the support is bent, with no damage to the connecting tracks or to the integrated circuit itself.

Provision can also be made for each card to have an internal code inside the card itself, the code being utilized as a component of the entry key to the information contained in the integrated circuit. Preferably this internal code is of the optical type and the card support is transparent to infrared rays.

It is also foreseen that the internal code may be inserted in the card by means of two different codification systems, one being the logical complement to the other, so that the alteration, for instance by adding on the surface ink opaque to infrared rays, of an area carrying the code written in the first codification system, obliges a forger to carry out a corresponding alteration on the other area, i.e. the removal of part of the ink forming the code written in the second codification system, which is impossible without destroying the support incorporating the code written in the two complementary codification systems.

BRIEF DESCRIPTION OF THE FIGURES

Further characteristics and advantages of the support according to the invention will be better illustrated with reference to the following description and to the enclosed drawings, wherein:

FIG. 4 shows a view in enlarged section of the card or pass according to the invention;

FIG. 5 shows an enlarged detail of the section of the card or pass of FIG. 4; and FIG. 6 shows an enlarged top view of the group: integrated circuit - connecting tracks - supporting film.

DETAILED DESCRIPTION

Figure 2:
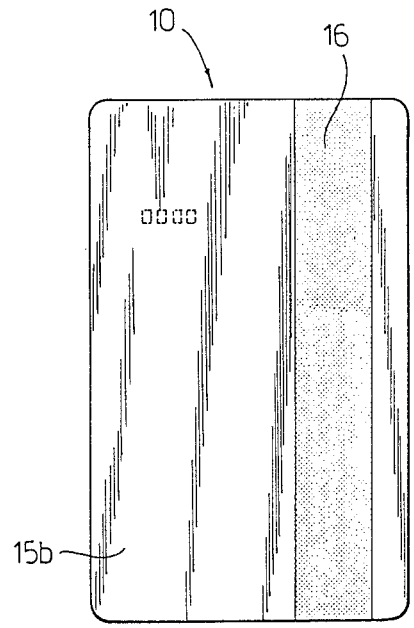
FIG. 2 shows a view of the other face of the card or pass according to the invention.

The card or pass 10 according to the invention consists of various layers of shock-resistant plastic film transparent to infrared light, attached to one another for instance by thermopressure welding. Inside these layers 15a and 15b a seat is provided for an integrated memory circuit 22 externally connected by means of four small electrical contacts, 11, 12, 13 and 14 respectively. On the lower face of the card (FIG. 2), a band 16 of magnetizable material, suitable for supporting information and compatible with the reading and writing systems presently used, can be applied. The magnetic band 16 is positioned on the paper in conformity with ISO standard or in any other area it needs to be placed. The magnetic band can be obtained both by smearing of magnetic ink and by applying a suitable magnetic strip.

Figure 3:
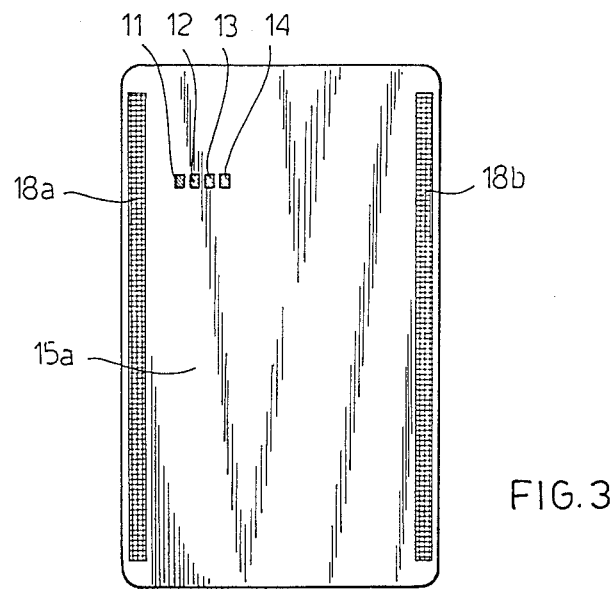
FIG. 3 shows a variation of the internal side of a layer forming the card or pass, duly treated.

On the internal face of one of the layers (according to the embodiment of FIG. 3 and 4) optical codes are printed along the portions indicated respectively with 18a and 18b by means of ink opaque to infrared rays. These optical codes can be read in transparency by means of an infrared light source and an optical detector working on the same wavelength. By means of these codes the marking of a particular code on each card is done during its manufacturing, thus making each card different from all the others.

For instance, a feasible way to prevent tampering of the optical code includes the printing in the two different areas 18a and 18b of an identical code, for instance a number, by two different codification systems, one being the logical complement of the other. The reading device will allow access to the information only after verifying whether the same code is present on both areas 18a and 18b. A forger who would want to alter the code would have to change both the areas, one complementary to the other, so as to keep their congruity unaltered.

With reference to FIGS. 4, 5 and 6, between layers 15a and 15b, a seat 19 is provided internally inside which an integrated circuit 22, covered by a suitable anti-dampness resin 23 and supported by metallic tracks 21, is placed. The metallic tracks are kept together by means of a kapton film 20; they come out from only one side of the integrated circuit and in their bending area 21a are free, i.e. not connected to the kapton film (FIG. 5 and 6). Such an arrangement allows, in the case of bending and/or twisting of the card, a good chance of movement to the integrated circuit inside seat 19, without the presence of destructive mechanical stress which would occur should the tracks 21 come out from various sides of the integrated circuit 22, or in the case they were coupled to the film 20 in the bending area. The contacts 11, 12, 13 and 14 are welded to the tracks 21 thanks to the particular shape of the latter, i.e. free on both sides in the welding area 21b. (FIG. 6). In the contrary case the presence of the kapton film would make a strong weld a problem. The integrated circuit is a memory capable of storing information even without feed and allowing its subsequent change by means of electrical signals. The memory capacity of the integrated circuit depends on the specific use and on the integrated circuit chosen. Data retention capacity, without alteration of the information, is at least 10 years.

The technology of the integrated circuit is the EEPROM one with a voltage converter on the chip capable to generate the programming voltage. In addition, a digital filter is implemented on the integrated circuit to clear the clock and data lines from external disturbances, thus increasing the safety of the data transmitted and/or received.

According to the invention, with the integrated circuit used, the interface between the memory and the outside world is of the serial type. The connection with the outside is through metallic contacts 11, 12, 13 and 14. The contacts have an approx. 1.76 mm×2.86 mm. dimension.

FIG. 5 shows enlarged seat 19 which receives the film portion and the integrated circuit. In seat 19 the integrated circuit can move as free interspaces 40 and 41 are provided in front of the lower and upper sides of the support. The integrated circuit thus has a certain moving space in case the card is bent. The area of the contacts 11, 12, 13 and 14 on the contrary is provided without interspaces which could allow oscillations, thus insuring a constant contact.

At least on the portions of layers 15a and 15b which come into contact with the metallic tracks 21, an antistatic treatment can be provided, for instance by depositing conductive lacquers.

Figure 1:
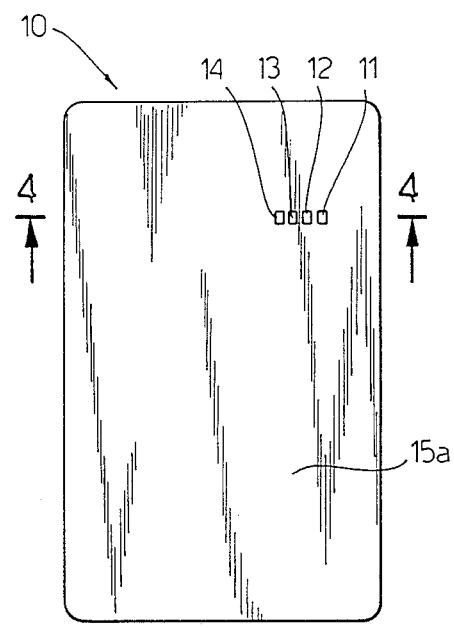
FIG. 1 shows a view of one face of the card or pass according to the invention.

With reference to FIG. 1, a particular electric signal is related to each contact 11, 12, 13 and 14. More precisely, according to the preferred embodiment, contact 11 is related to the input incoming line at 5 Volts (VCC); contact 12 is related to the input outgoing line (VSS), contact 13 is related to the incoming line of the data synchronizing clock (SCL); contact 14 is related to the two-directional line of the serial data (SDA). The typical working parameters for each signal in correspondence to the contacts are preferably the following:

VCC: +5 V in direct current ±5%; VSS
: 0 V;
SCL: signal which has the logical zero comprised between −1 and +0.8 V and the logical one comprised between 2 V and VCC+0.5 V. The frequency field allowed is between 0 and 100 kilohertz. The duration of a low half-cycle is not inferior to 4.7 microseconds, and of a high half-cycle is not inferior to 4 microseconds.

SDA: represents the two-directional line at open drain having the same electrical characteristics of signal SCL.

The logical zero included between −1 V and +0.8 V is also defined as low logical level.

The logical one included between 2 V and VCC+0.8 V is also defined as high logical level.

With the four contacts we have a communication protocol between the integrated memory circuit and the reading/writing device which works as follows :

the reading/writing device provides the clock signal for data transfer from and to memory.

The SDA line can change status only while SCL is low. Status variations of SDA while SCL is high are only to indicate START and STOP conditions.

According to the protocol, all of the controls are preceded by the START condition consisting in a transition from high to low of SDA while SCL is high. All communications end with a STOP condition consisting in a transition from low to high of SDA while SCL stays high.

The data receiving device, after having received eight data or command bits informs the transmitting device of the acceptance; to do so during the ninth clock cycle the receiver puts the SDA line low starting an identification. The absence of such identification indicates that the receiving device is engaged and the operation is to be tried again. It is foreseen that the data and/or control bytes are sent out starting from the most significant bit.

A group consists of eight bytes where the first byte is in a memory location of a multiple of 8 address. At START condition, memory selection is carried out by means of a word of eight bits formed by 1, 0, 1, 0, A2, A1, AO, RW where A2, A1, AO indicate which page of 256 bytes will be interested in the subsequent operation, RW indicates whether the subsequent operation will be a reading (RW=1) or writing (RW=0) one and is the less significant bit of the selection word.

For the writing operation of 1 byte, the memory requires a second address field of 8 bits, which specifies which one of the 256 memory cells of the selected page will be used, following by the value (1 byte) to be written in the memory and by the STOP condition.

If instead we want to procede to the writing operation of a group the process is similar to the 1 byte writing operation, supplying as address the one of the group first byte, followed by 8 data bytes and by the STOP condition.

In the reading operation the communication starts as per the writing operation with the difference that the RW bit of the selecting word is placed on 1.

For the reading of any memory cell, according to the protocol, a fake writing operation must be first carried out, i.e. an operation where the address is sent without the data byte. This operation is used to select the address of the byte which is to be read. Subsequently the protocol sends the selection command with RW=1 and, by continuously generating the clock signal, it receives the desired byte from the memory. If, according to the protocol, we keep generating the clock signal, the memory keeps sending new bytes, increasing the memory address from which they are taken. If the memory address goes over the limits of the 256 bytes page, the address is put to zero so that the bits selected later on are taken starting from the beginning of the same page. The operation ends with a STOP condition.

It is evident that this communication protocol insures that the exchange of data with the outside is through four contacts only. We have anyhow a circuit support which guarantees a greater working reliability as compared to the existing ones and which can be mass produced. Moreover, with such an arrangement, a unique external input at +5 V is foreseen.

I claim:

1. An identification system, comprising
    (a) a card formed of synthetic plastic material which is transparent to infrared rays;
    (b) an integrated memory circuit arranged within said card and comprising a plurality of memory cells and voltage conversion circuits for generating the voltages necessary for programming said cells;
    (c) an optical code univocally associated with and arranged within said card, said code further being associated with data contained in said memory circuit and being used as a component of an access key for the information stored in said memory circuit via an external reading/writing device; and
    (d) four contacts arranged on said card and connected with said memory circuit and including a first contact (VCC) receiving a feed signal, a second contact (VSS) being connected with a feed return line, a third contact (SCL) transmitting a logic signal acting as a clock signal for data and instructions, and a fourth contact (SDA) connected with an open drain two-dimensional line and acting as a support for data and instructions,
    (e) the voltage applied to said third and fourth contacts being variable between low and high logic levels;
    (f) said external reading/writing device providing the clock signal for transferring data from and to said memory circuit;
    (g) the line connected with said fourth contact changing its status only when said third contact is low with said fourth contact status variations occurring when said third contact is high and being used to indicate START and STOP conditions for a transmission;
    (h) all controls being preceded by the START condition with no data byte following it and subsequently the selection control is sent with RW=1 and, continuing to generate the clock signal, the desired byte is received from the memory, whereby if the generation of the clock signal continues, the memory continues to send new bytes, increasing the memory addres from which they are drawn and if the memory address exceeds the limit of the 256 bytes page, said address is put to zero so that the bits selected subsequently are taken commencing from the beginning of the same page.

2. An identification system as defined in claim 1, wherein the internal univocal code is inserted into said card by means of at least two different codification systems, one being the logical complement of the other, placed in different areas of said card so that alteration of said code is possible by modifying both areas, in a completely logical complementary way, so as to keep their congruency unaltered, said alteration being impossible without delaminating the card itself.

3. An identification system as defined in claim 2, wherein said contacts are placed along a single line of only one layer of said card.

4. An identification system as defined in claim 3, wherein said contacts are connected with the integrated circuit in such a way that the connections derive from a single side of said card.

5. An identification system as defined in claim 2, wherein said card includes an internal seat, and further wherein the thickness of said memory circuit is less than the height of said seat, whereby support for said circuit comprises the conductive tracks thereof which allows said circuit to swing in its seat.

6. A card, comprising
    (a) at least two mated layers of plastic material (15a and 15b) transparent to infrared rays;
    (b) an integrated memory circuit (22) of EEPROM technology connected with the outside of said layers through four contacts (11, 12, 13, 14) and containing voltage conversion circuits capable to generate internally, starting from a single voltage, a voltage necessary for the memory cells programming;
    (c) an internal univocal code written on internal faces of one of said layers by means of at least two different codification systems, one being the logical complement of the other, placed in different areas (18a and 18b), so that the alteration of said code is possible only by modifying both areas (18a and 18b) in a completely logical complementary way, so as to keep their congruency unaltered and that said alteration is not possible without delaminating the card itself.

7. A card as defined in claim 6, wherein said contacts (11, 12, 13, 14) are connected with said integrated circuit (22) in such a way that the connections derive from a single side of said card, the integrated circuit (22) thickness being less than the height provided for a seat (19), so that the only support for the integrated circuit (22) is four conductive tracks (21) thereof which allow the integrated circuit (22) to swing in its seat (19).

* * * * *